3766½X
J. NASH
Plow.
Patented Oct. 14, 1823
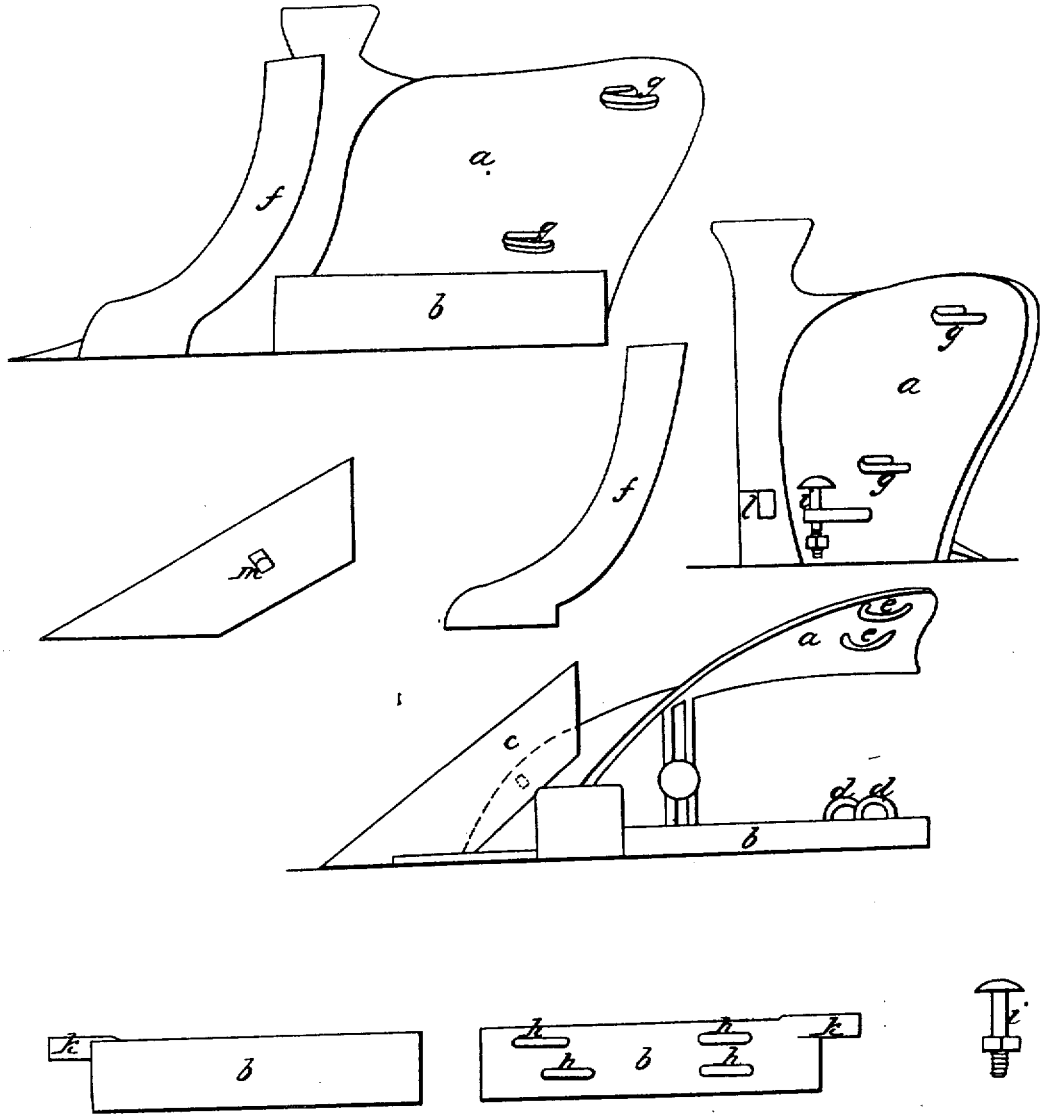
AM. PHOTO-LITHO. CO. N.Y. (OSBORNE'S PROCESS)

37663X

UNITED STATES PATENT OFFICE.

JOHN NASH, OF MIDDLEBURY, OHIO.

IMPROVEMENT IN PLOWS.

Specification forming part of Letters Patent dated October 14, 1823.

*To all whom it may concern:*

Be it known that I, JOHN NASH, of Middlebury, in the county of Summit and State of Ohio, have invented certain new and useful Improvements in Plows, of which the following is a specification.

The mold-board, landside, and share of this plow must be made of cast-iron. Two loops must be cast in the landside, as also on the mold-board, to receive the handles. This plow has no colter, but has a sword or edge with two and one-quarter inches projecting, to be cast solid with the mold-board or locked on with and by the share, so as to be changed, if required, to suit purchasers. In the angle or groin of this plow, on the inside, there are three loops—one on the mold-board and two on the landside—which are bolted together and form something like a hinge. The advantage of this is to keep the plow from spreading. These loops or parts of the hinge must be cast solid on the landside and mold-board. The part of the landside forward of the loops must have a shoulder cast on it of three-eighths of an inch projection inward, which shoulder fits into a mortise or box cast in the mold-board to receive it. The share locks on the mold-board with a lock or hitch, which is fastened by a wedge or key inside. A part of the above-named sword or edge is cast solid on the share. It is intended to make these plows either right or left handed.

Proportions of this plow: length of share from point to point, fifteen and one-half inches; sets on the mold-board, ten and one-half inches; length of mold-board behind the share, seven and one half inches; height of mold-board at the throat, eleven and one-half inches; height of the standard, twenty and one-half inches; length of the landside, nineteen and one-quarter inches; extreme length of the landside at bottom, twenty-three inches; extreme length of mold-board at top, twenty-six and one-half inches. It is intended for these proportions to be continued, let the plow be made of what size it will.

I claim—

The manner of putting this plow together by the loops or hinge, as also the shoulder and mortise or box, and likewise the sword or edge in lieu of a colter.

JOHN NASH.

Witnesses:
CHARLES BURTON,
ROBT. W. FENWICK.